(12) United States Patent
Ohta (10) Patent No.: US 6,724,555 B2
(45) Date of Patent: Apr. 20, 2004

(54) DATA DETECTING APPARATUS AND METHOD THEREOF

(75) Inventor: Haruo Ohta, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 403 days.

(21) Appl. No.: 09/803,777

(22) Filed: Mar. 12, 2001

(65) Prior Publication Data

US 2001/0040749 A1 Nov. 15, 2001

(30) Foreign Application Priority Data

Mar. 10, 2000 (JP) ..................................... 2000-066498

(51) Int. Cl.$^7$ ............................................. G11B 5/035
(52) U.S. Cl. .............................. 360/65; 360/46; 360/53; 714/795
(58) Field of Search ........................... 360/53, 46, 65; 714/795; 375/350, 341

(56) References Cited

U.S. PATENT DOCUMENTS 6,046,874 A * 4/2000 Takahashi ..................... 360/65
6,519,715 B1 * 2/2003 Takashi et al. ................ 714/32
6,522,705 B1 * 2/2003 Conway et al. ............. 375/341

FOREIGN PATENT DOCUMENTS

| JP | 7-249998 | 9/1995 | .......... H03M/13/12 |
| JP | 8-293164 | 11/1996 | .......... G11B/20/14 |

* cited by examiner

*Primary Examiner*—David Hudspeth
*Assistant Examiner*—Glenda P Rodriguez
(74) *Attorney, Agent, or Firm*—RatnerPrestia (57) ABSTRACT

A data detecting method and its apparatus for equalizing an input signal reproduced from magnetic recording media by partial response by employing at least one of partial response class 4 (PR4) and extended partial response class 4 (EPR4), and decoding the input signal. The input signal is equalized by PR4, and a first equalized signal is obtained. First decoded data is obtained from the first equalized signal. The input signal is equalized by EPR4, and a second equalized signal is obtained. Second decoded data is obtained from the second equalized signal. From the first equalized signal and second equalized signal, the signal condition of the input signal is judged, and the optimum data detecting method is discriminated. Thus, either the first decoded data or second decoded data is selected as detected data.

16 Claims, 7 Drawing Sheets

DATA DETECTING APPARATUS AND METHOD THEREOF

FIELD OF THE INVENTION

The present invention relates to a data detecting apparatus and its method for reproducing data recorded in recording media, and detecting data from the reproduced signal, and more particularly to a method and apparatus for realizing always a low error rate.

BACKGROUND OF THE INVENTION

Recently, the recording density of recording devices such as hard disk and magnetic tape is becoming higher, and their recording capacity is increasing. In order to decode the data detected from these magnetic recording devices at low error rate, the detecting apparatus is designed to equalize the reproduced signal by partial response, and then decode at maximum likelihood by a Viterbi decoder or the like to detect data. This equalizing technology is known as partial response maximum likelihood (PRML) method. Generally two PRML methods are known well, and have been employed in magnetic recording devices. One is the partial response class 4 maximum likelihood (PR4ML) method, which equalizes and decodes the reproduced signal at maximum likelihood, so that the intersymbol interference may be [1, 0, −1]. Other is the extended partial response class 4 maximum likelihood (EPR4ML), which equalizes and decode the reproduced signal at maximum likelihood, so that the intersymbol interference may be [1, 1, −1, −1].

The error rate of the data decoded by the PR4ML or EPR4ML system depends on the frequency components of signal and noise included in the reproduced signal. Generally, the PR4ML method can lower the error rate when the linear recording density is relatively low, and the EPR4ML method can lower the error rate when the linear recording density is relatively high.

Based on such fact, in the case of a conventional hard disk device, as disclosed in Japanese Patent Publication No. 2718424 and Japanese Laid-open Patent No. 8-293164, the EPR4ML and PR4ML methods are changed over, so that EPR4ML is applied in the inner circumference having high linear recording density and PR4ML is applied in the outer circumference having low linear recording density.

Japanese Patent Publication No. 2718424 discloses a magnetic disk reproducing device in which the data detector by the PR4ML system and the data detected by the EPR4ML system are changed over between the outer circumference and inner circumference of the disk, but teaches nothing about the specific method and specific configuration.

Japanese Laid-open Patent No. 8-293164 teaches to select either the PR4ML method or the EPR4ML method according to the position information of the disk registered preliminarily in the magnetic disk reproducing device, in other words, depending on the cylinder address.

Actually, however, it depends on the frequency components of signal and noise included in the reproduced signal which one of the PR4ML or EPR4ML can detect data at lower error rate. These frequency components vary significantly depending not only on the linear recording density of the recording media, but also on fluctuations of characteristics of recording media and magnetic head, time-course changes of characteristics of recording media and magnetic head, variation of spacing distance between the recording media and magnetic head, and scanning performance of magnetic head on the recording media. It is, therefore, impossible to realize the optimum low error rate always at the time of reproduction by the conventional detecting method depending only on the position information of the recording media corresponding to the linear recording density.

In particular, even in the magnetic tape recording and reproducing device having a constant linear recording density, frequency components of signal and noise included in the reproduced signal are always varying, owing to fluctuations of characteristics of magnetic tape and magnetic head, time-course changes of characteristics of magnetic tape and magnetic head, variation of spacing distance between the recording media and magnetic head, instability of contact and scanning of magnetic head on the magnetic tape, and difference in the case when reproducing a tape recorded by other magnetic tape recording device, that is, at the time of exchanging the reproducing devices. Therefore, in the magnetic tape recording and reproducing device, the best equalizing and decoding method to be applied among PR4ML or and EPR4ML is changing every moment. Moreover, in the conventional magnetic disk device, of course, it is not sufficient that the detecting method is selected based only on the linear recording density determined by the position of the disk.

SUMMARY OF THE INVENTION

It is hence an object of the invention to present a data detecting apparatus and its method capable of detecting data always at low error rate, by automatically selecting the best method among PR4ML method and EPR4ML method every moment depending on the state of reproduced signal, without referring to the position information on the disk corresponding to the predetermined linear recording density.

It is another object of the invention to present a data detecting apparatus and its method capable of automatically saving power consumption without interrupting data at the time of selection of optimum method among the PR4ML method and the EPR4ML method depending on the condition of the reproduced signal.

To achieve these objects, the data detecting method of the invention monitors the state of the reproduced signal in real time, discriminates the state of signal and noise in the reproduced signal, generates a condition discriminating signal, and automatically selects the best or optimum method among PR4ML and EPR4ML method every moment according to this condition discriminating signal.

Therefore, the data detecting method of the invention selects the best or optimum method among the PR4ML method and EPR4ML method depending on the condition of the reproduced signal itself in real time, so that it always realizes most preferable data detection method having low error rate.

Moreover, the data detecting method of the invention controls, at different timing, the operations of first decoding, second decoding and selection of system depending on the condition discriminating signal, respectively, so as hence to reduce power consumption in first decoding and second decoding operations.

Therefore, the data detecting method of the invention automatically selects the most preferable data decoding method having low error rate out of PR4ML and EPR4ML methods, every moment depending on the condition of the reproduced signal itself, at low power consumption without interrupting the data.

DESCRIPTION OF THE PREFERRED EMBODIMENTS

Referring now to the drawings, preferred embodiments of the invention are described below.

Figure 1:
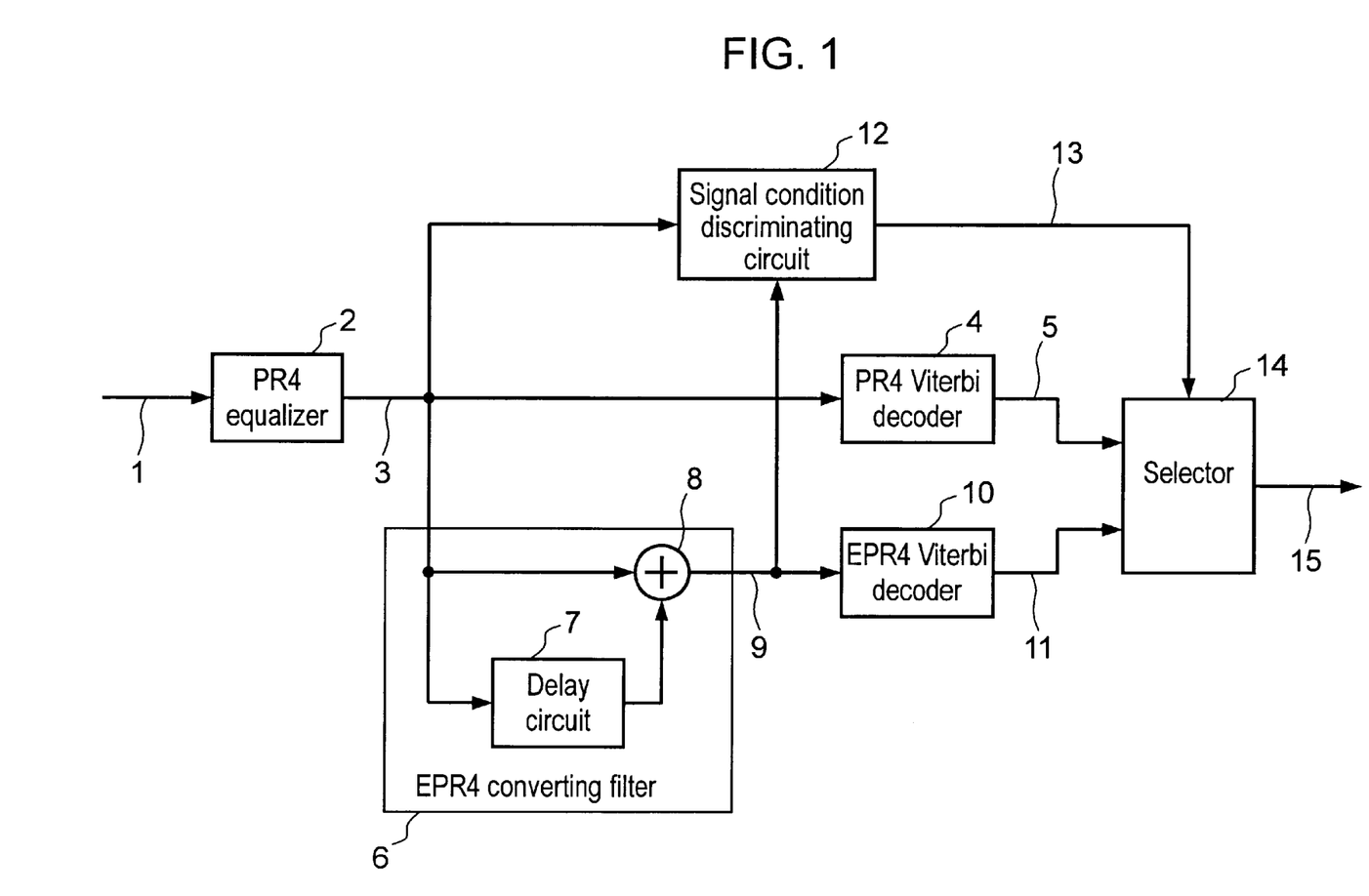
FIG. 1 is a block diagram showing a configuration of an embodiment for realizing the data detecting method of the invention.

FIG. 1 is a block diagram showing a configuration of an embodiment for realizing the data detecting method of the invention, relating to a method of discriminating the signal condition of the input signals from first decoded output signal and second decoded output signal, and detecting data based on the result.

Figure 2:
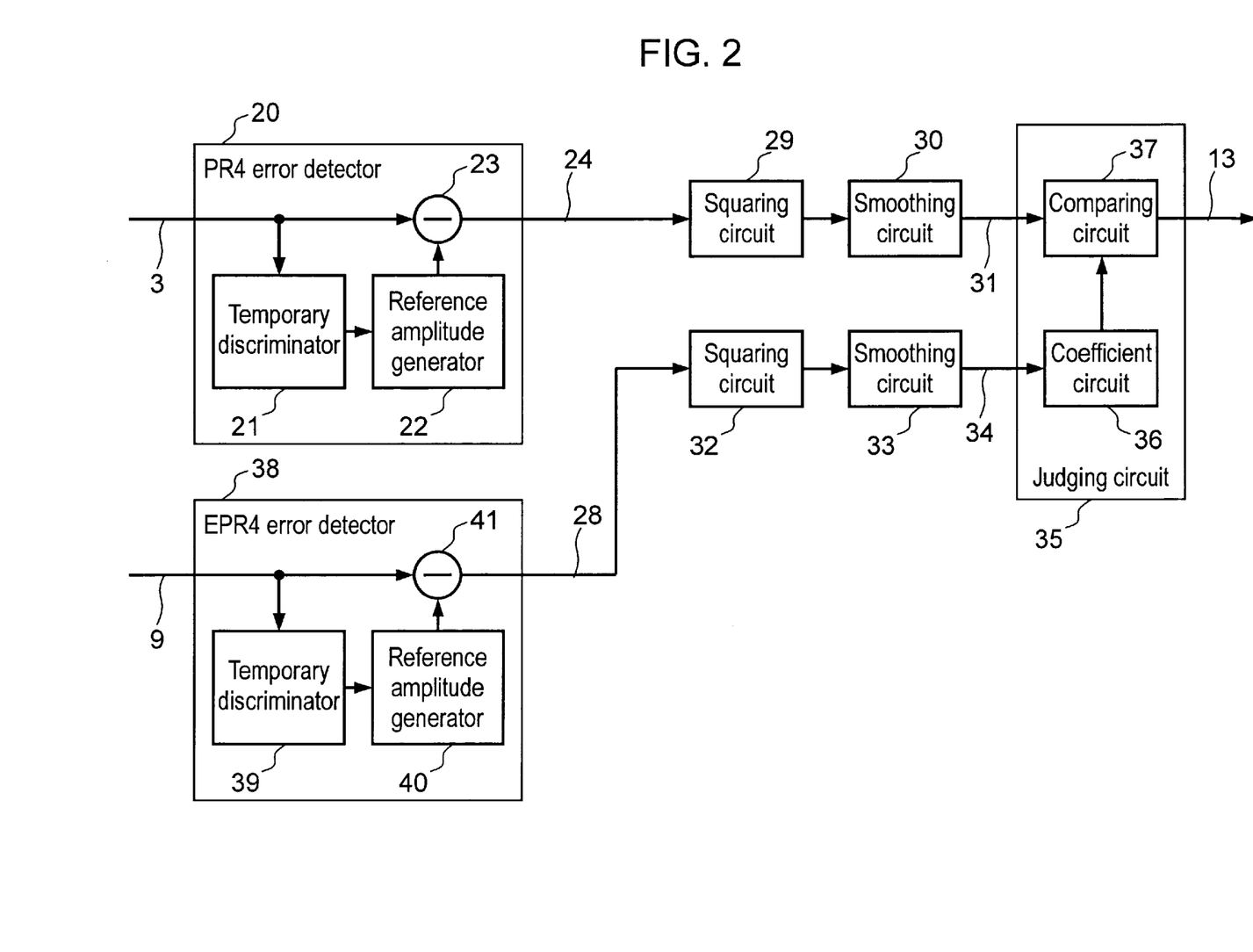
FIG. 2 is a block diagram showing a detailed structure of a signal condition discriminating circuit 12 in the invention.

FIG. 2 is a block diagram showing a detailed structure of a signal condition discriminating circuit 12 in the invention. The embodiment is explained by referring to FIG. 1 and FIG. 2.

In the data detecting method in the embodiment shown in FIG. 1, a reproduced signal 1 is equalized in a PR4 equalizing circuit 2 by partial response class 4 (PR4), so as to obtain a PR4 equalized signal 3. A PR4 Viterbi decoder 4 decodes this PR4 equalized signal 3, so as to obtain a PR4 Viterbi decoded data 5. Further, the PR4 equalizing circuit 2 and EPR4 converter 6 equalize the reproduced signal 1 by extended partial response class 4 (EPR4), so as to obtain an EPR4 equalized signal 9. An EPR4 Viterbi decoder 10 decodes this EPR4 equalized signal 9, to obtain EPR4 Viterbi decoded data 11.

After then, a signal condition discriminating circuit 12 judges the signal condition of the reproduced signal 1 based on the PR4 equalized signal 3 and EPR4 equalized signal 9, so as to generate a condition discriminating signal 13, which indicates the optimum data detecting method. Based on the result of discrimination by the condition discriminating signal 13, a selector 14 selects one of the PR4 Viterbi decoded data 5 and the EPR4 Viterbi decoded data 11 as detected data.

The reproduced signal 1 reproduced by a head from recording media (not shown) is put into the PR4 equalizing circuit 2. The PR4 equalizing circuit 2 equalizes the reproduced signal 1 by PR4 so that the intersymbol interference may be [1, 0, −1]. The PR4 equalizing circuit 2 distributes the equalized signal as PR4 equalized signal 3 into the PR4 Viterbi decoder 4, EPR4 converting filter 6, and signal condition discriminating circuit 12.

The PR4 Viterbi decoder 4 decodes the PR4 equalized signal 3 entered at maximum likelihood by the Viterbi decoding method by utilizing the intersymbol interference of PR4, and supplies the selector 14 with this data decoded at maximum likelihood as PR4 decoded data 5. This PR4 decoded data 5 is a result of equalizing the reproduced signal 1 by PR4 at maximum likelihood and decoding by Viterbi.

The EPR4 converting filter 6 converts and filters the PR4 equalized signal 3 input from the PR4 equalizing circuit 2, and produces an EPR4 equalized signal 9.

The EPR4 converting filter 6 equalizes the PR4 equalized signal 3 to produce EPR4 equalized signal 9, in which intersymbol interference may be [1, 1, −1, −1]. The EPR4 converting filter 6 supplies this equalized signal to the EPR4 Viterbi decoder 10 and signal condition discriminating circuit 12 as EPR4 equalized signal 9.

The EPR4 converting filter 6 is composed of a delay circuit 7 and an adder 8. The adder 8 adds the PR4 equalized signal 3 of input to a PR4 equalized signal delayed by one symbol period, and generates an EPR4 equalized signal 9 based on the relation between the intersymbol interference of PR4 and intersymbol interference of EPR4. Thus, the EPR4 equalization is realized by the configuration in FIG. 1 composed of the PR4 equalizing circuit 2 and EPR4 converting filter 6. Therefore, this configuration can reduce the circuit scale and can realize a stable operation. The EPR4 Viterbi decoder 10 decodes the EPR4 equalized signal 9 of input by Viterbi maximum likelihood decoding method utilizing the intersymbol interference of EPR4. The EPR4 Viterbi decoder 10 supplies this maximum likelihood decoded signal to the selector 14 as EPR4 decoded data 11. The EPR4 decoded data 11 is the result of equalizing by EPR4 and of decoding by Viterbi maximum likelihood.

The signal condition discriminating circuit 12 discriminates the signal condition of the reproduced signal 1 on the basis of the PR4 equalized signal 3 obtained from the PR4 equalizing circuit 2 and the EPR4 equalized signal 9 obtained from the EPR4 converting filter 6. The signal condition discriminating circuit 12 generates the result of discrimination as a condition discriminating signal 13. The condition discriminating signal 13 indicates which one of PR4ML and EPR4ML methods may get lower error rate. The condition discriminating signal 13 controls the selector 14 which selects the data of lower error rate among from the PR4 decoded data 5 and EPR4 decoded data 11, and generates decoded data 15.

Referring to FIG. 2, the structure and operation of the signal condition discriminating circuit 12 are explained.

The condition discriminating signal 13 is generated as follows. First, a PR4 error detector 20 extracts an error from the PR4 equalized signal 3 which is a first equalized signal, and obtains a PR4 error signal 24 which is a first error signal. A square circuit 29 and a smoothing circuit 30 average the square values of the PR4 error signal 24, and obtain a PR4 smoothed error signal 31 which is a first smoothed error signal.

Next, an EPR4 error detector 38 extracts an error from the EPR4 equalized signal 9 which is a second equalized signal, and obtains an EPR4 error signal which is a second error signal. A square circuit 32 and a smoothing circuit 33 average the square values of the EPR4 error signal 28, and obtain an EPR4 smoothed error signal 34 which is a second smoothed error signal.

Further, a judging circuit 35 judges the condition of the reproduced signal 1 from the condition of the PR4 smoothed error signal 31 and EPR4 smoothing error signal 34.

That is, in the judging circuit 35, a coefficient circuit 36 multiplies the entered EPR4 smoothed error signal 34 by a coefficient of a specific value, and supplies the result to a comparator 37. The comparator 37 compares the signal issued from the coefficient circuit 36 and the PR4 smoothed error signal 31, and issues a condition discriminating signal 13 as result of discrimination.

The operation of the PR4 error detector 20 and EPR4 error detector 38 is described in detail.

In the PR4 error detector 20, a temporary discriminator 21 judges the signal of the entered PR4 equalized signal 3, and supplies the judged result to a reference amplitude generator 22. The reference amplitude generator 22 generates a reference amplitude based on the judged result. A subtracter 23 subtracts the reference amplitude from the entered PR4 equalized signal 3, and generates a PR4 error signal 24.

In the EPR4 error detector 38, a temporary discriminator 39 judges the entered EPR4 equalized signal 9, and supplies the judged result to a reference amplitude generator 40. The reference amplitude generator 40 generates a reference amplitude based on the judged result. A subtracter 41 subtracts the reference amplitude from the entered EPR4 equalized signal 9, and generates an EPR4 error signal 28.

The amplitude of the PR4 equalized signal 3 entered in the PR4 error detector 20 is an amplitude of any one of A, 0 and −A in an ideal condition free from noise. Herein, A is a specified positive value. Since the PR4 equalized signal 3 contains noise, the PR4 error detector 20 extracts an error amplitude showing the difference between the PR4 equalized signal 3 containing noise and an ideal PR4 equalized signal.

The temporary discriminator 21 compares the PR4 equalized signal 3 with three amplitude values A, 0 and −A, and judges which amplitude may be closest to the amplitude of the PR4 equalized signal 3, and supplies the judged result to the reference amplitude generator 22. The reference amplitude generator 22 determines one of the amplitude values of A, 0 and −A as a reference amplitude, based on the judged result of the temporary discriminator 21, and supplies the reference amplitude to the subtracter 23. This reference amplitude is an estimated amplitude value, and is an ideal condition free from noise. The subtracter 23 subtracts this reference amplitude from the amplitude of the entered PR4 equalized signal 3, and generates a PR4 error signal 24. Therefore, if the result of judgement by the temporary discriminator 21 is approximately correct, the PR4 error signal 24 is the amplitude of component other than the signal included in the PR4 equalized signal 3, that is, noise component. The square circuit 29 squares the PR4 error signal 24 entered from the PR4 error detector, and supplies the smoothing circuit 30 with the square value of the error amplitude. The smoothing circuit 30 smoothes the square value of the error signal 29, generates a PR4 smoothed error signal 31, and supplies it to the judging circuit 35.

On the other hand, the amplitude of the EPR4 equalized signal 9 entered in the EPR4 error detector 38 is any one amplitude of 2 A, A, 0, −A, and −2 A in an ideal condition free from noise. Herein, the value of A is a specified positive value. Since the EPR4 equalized signal 9 includes noise, the EPR4 error detector 38 extracts an error amplitude showing the difference between the EPR4 equalized signal 9 including noise and an ideal EPR4 equalized signal.

The temporary discriminator 39 compares the EPR4 equalized signal 9 with five amplitude values 2 A, A, 0, −A, and −2 A, and judges which amplitude is closest to the amplitude of the EPR4 equalized signal 9, and supplies the result to a reference amplitude generator 40. The reference amplitude generator 40, on the basis of the judged result of the temporary discriminator 39, determines one of the amplitude values of 2 A, A, 0, −A, and −2 A as the reference amplitude, and supplies it to the subtracter 41. This reference amplitude is an estimated amplitude value, and is an ideal condition free from noise. The subtracter 41 subtracts this reference amplitude from the amplitude of the entered EPR4 equalized signal 9, and generates an EPR4 error signal 28. Therefore, if the result of judgement by the temporary discriminator 39 is approximately correct, the EPR4 error signal 28 is the amplitude of component other than the signal included in the EPR4 equalized signal 9, that is, noise component. The square circuit 32 squares the entered EPR4 error signal 28, and supplies the smoothing circuit 33 with the square value of the error amplitude. . The smoothing circuit 33 smoothes the square value of the EPR4 error signal 28 issued from the square circuit 32, and supplies it to the judging circuit 35.

The function and structure of the judging circuit 35 are described below.

The judging circuit 35 judges the condition of the reproduced signal 1 based on the condition of the PR4 smoothed error signal 31 which is a first smoothed error signal and the EPR4 smoothed error signal 34 which is a second smoothed error signal. Herein, the condition discriminating signal 13 is issued as the result of discrimination for selecting the PR4 decoded data 5 of the first decoded data if the PR4 smoothed error signal 31 of first smoothed error signal is smaller in amplitude than the EPR4 smoothed error signal 34 multiplied by a specific value of second smoothed error signal, and for selecting the EPR4 decoded data 11 of the second decoded data in the other cases.

The judging circuit 35 compares the PR4 smoothed error signal 31 with the EPR4 smoothed error signal 34 obtained from the smoothing circuit 33. Herein, supposing the amplitude of the PR4 smoothed error signal 31 is Esq (PR4), the signal to noise ratio (SNR) of the PR4 equalized signal 3, that is SNR (PR4), is defined as shown in formula (1).

$$SNR(PR4)=A/\sqrt{Esq(PR4)} \qquad (1)$$

Supposing the amplitude of the EPR4 smoothed error signal 34 is Esq (EPR4), the signal to noise ratio (SNR) of the EPR4 equalized signal 9, that is SNR (EPR4), is defined as shown in formula (2).

$$SNR(EPR4)=2A/\sqrt{Esq(EPR4)} \qquad (2)$$

By many experiments using the magnetic tape device, the error rate of PR4ML data detection, error rate of EPR4ML data detection, and the relation between the SNR (PR4) in formula (1) and SNR (EPR4) in formula (2) were measured. As a result, it is found that data can be detected at lower error rate in the EPR4ML method than in the PR4ML method when the SNR (EPR4) is higher by about 3.8 dB than the SNR(PR4). That the SNR (EPR4) is higher by about 3.8 dB than the SNR(PR4) is equivalent to that Esq (EPR4) multiplied by 0.6 is smaller than Esq (PR4). Hence, based on the relation of the amplitude between the PR4 smoothed error signal 31 expressing Esq (PR4) and the EPR4 smoothed error signal 34 expressing Esq (EPR4), it is estimated which one of PR4ML and EPR4ML may be detected at lower error rate.

The coefficient circuit 36 multiplies the entered EPR4 smoothed error signal 34 by the coefficient of 0.6 corresponding to 3.8 dB, and issues the multiplied product to the comparator 37. The comparator 37 compares the multiplied product with the amplitude of the PR4 smoothed error signal 31, and supplies the selector 14 with the condition discriminating signal 13 as the result of comparison. The condition discriminating signal 13 is a signal for estimating which one of PR4ML and EPR4ML can detect the data at lower error rate. That is, the condition discriminating signal 13 makes the selector 14 (FIG. 1) select the signal of PR4ML method in a case when the PR4 smoothed error signal 31 is smaller than the multiplied product, and it makes the selector 14 select the EPR4ML method in the other case.

Back to FIG. 1, the selector 14 selects either the PR4 decoded data 5 entered from the PR4 Viterbi decoder 4 or the EPR4 decoded data 11 entered from the EPR4 Viterbi decoder 10, depending on the condition discriminating signal 13 entered from the signal condition discriminating circuit 12. This condition discriminating signal 13 controls the selector 14, and forms reproduced decoded data 15 by selecting the decoded data having lower error rate from among the PR4 decoded data 5 and EPR4 decoded data 11.

The selector 14 selects the PR4 decoded data 5 when the condition discriminating signal 13 shows that the data can be detected at lower error rate in the PR4ML method, and selects the EPR4 decoded data 11 when it shows that the data can be detected at lower error rate in the EPR4ML method, and then issues the result as reproduced decoded data 15. In this way, the embodiment can select and generate reproduced decoded data 15 among PR4ML and EPR4ML which is judged to have lower error rate.

Thus, the data detecting apparatus of the embodiment is capable of detecting data always at low error rate by monitoring the condition of the reproduced signal in real time, and automatically selecting the more preferable one from among the PR4ML method and EPR4ML method every moment depending on the condition of the reproduced signal. In this constitution, the signal condition discriminating means can be realized in a simple structure.

In the embodiment shown in FIG. 2, the signal condition discriminating circuit 12 squares the error signal and then smoothes it, but it may be also designed to smooth the absolute value of the error signal. In this case, the square circuit 29 and square circuit 32 can be replaced by any circuit being able to generate absolute values of input. In such case, supposing the amplitude of the PR4 smoothed error signal 31 by smoothing the absolute value of the PR4 error signal 24 is Eabs (PR4), then SNR (PR4), that is the SN ratio of signal to noise of PR4 equalized signal 3, is defined as in formula (3).

$$SNR(PR4)=A/Eabs(PR4) \quad (3)$$

Similarly, supposing the amplitude of the EPR4 smoothed error signal 34 by smoothing the absolute value of the EPR4 error signal 28 is Eabs (EPR4), then SNR (EPR4), that is the SN ratio of signal component and noise component of EPR4 equalized signal 9, is defined as in formula (4).

$$SNR(EPR4)=2A/Eabs(EPR4) \quad (4)$$

By an experiment using a magnetic tape device, same as in the embodiment in FIG. 2, it has been known that the data can be detected at lower error rate in the EPR4ML method than in the PR4ML system when the SNR (EPR4) in formula (4) is higher by about 3.8 dB than SNR(PR4) in formula (3). Herein, that the SNR (EPR4) is higher by about 3.8 dB than the SNR(PR4) is equivalent to that 0.77 times of Eabs (EPR4) is smaller than Eabs (PR4), as known from formula (3) and formula (4). In the judging circuit 35, herein, the coefficient circuit 36 multiplies the EPR4 smoothed error signal 34 by coefficient 0.77 equivalent to conversion of 3.8 dB, and its product is compared with the amplitude of the PR4 smoothed error signal 31 in the comparator 37. At this time, the judging circuit 35 issues a condition discriminating signal 13 showing to select the PR4ML method in a case when the PR4 smoothed error signal 31 is smaller than the output of the coefficient circuit 36, and to select the EPR4ML method in the other case. Hence, the method of processing the error signal by the absolute value brings about almost similar effects to the method of squaring the error signal, and the circuit is composed more easily than in the square method.

According to the results of the experiment, in the embodiment, when the SNR (EPR4) is higher by about 3.8 dB than the SNR (PR4), the EPR4ML method can detect the data at lower error rate than the PR4ML method. However, since the criterion of the recording and reproducing system depends on the state and condition of the system, the value 3.8 dB is not always the criterion in all systems. Therefore, the selection standard of the PR4ML system and EPR4ML system is not limited to the criterion of 3.8 dB alone, but should be set properly depending on the condition of the applied recording and reproducing system.

Figure 3:
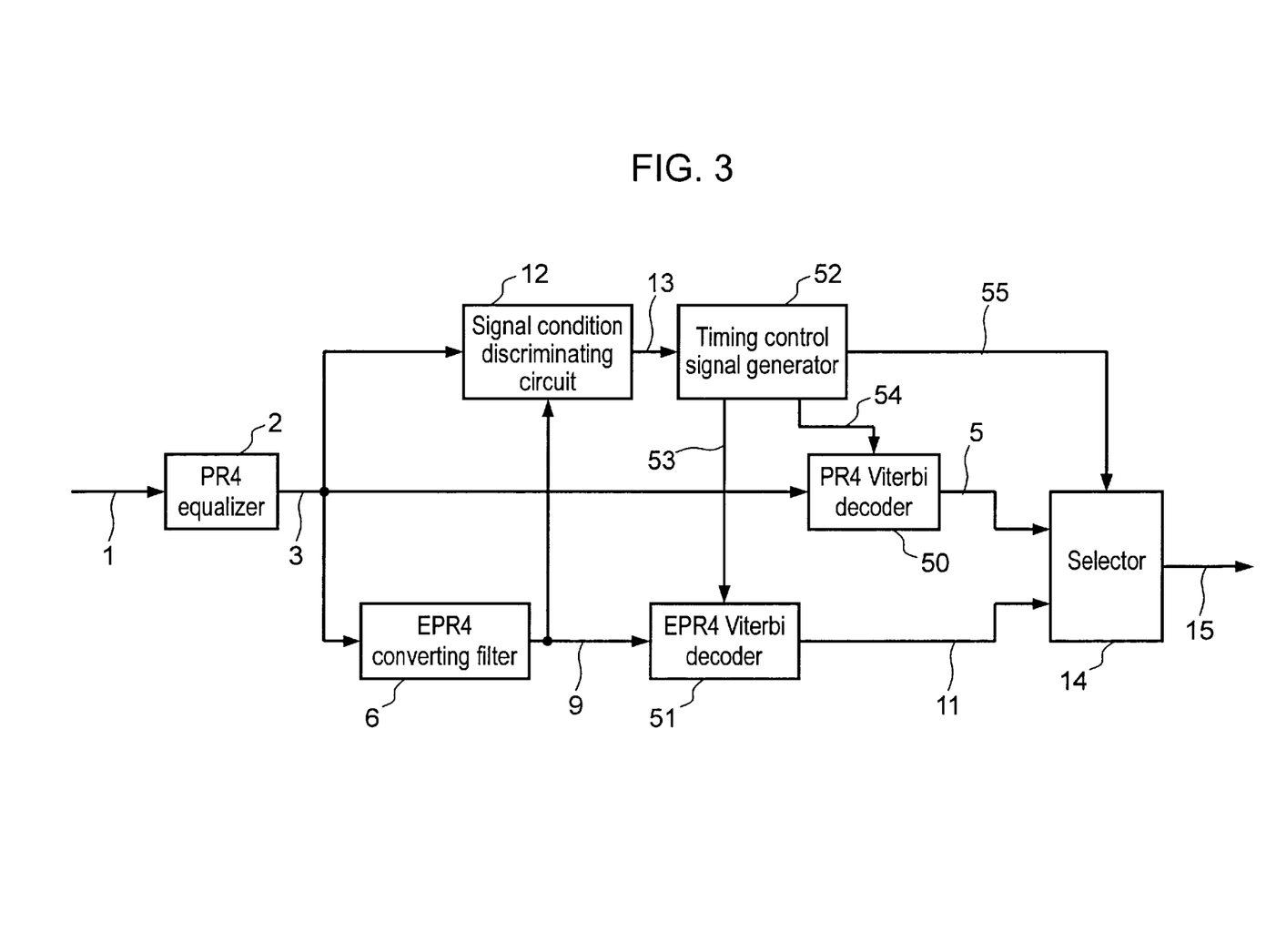
FIG. 3 is a block diagram showing a configuration of another embodiment for realizing the data detecting method of the invention.

FIG. 3 is a block diagram showing a configuration of another embodiment for realizing the data detecting method of the invention. Depending on the signal state of reproduced signal 1, the condition discriminating signal 13 selects, through a timing control signal generator 52, one of the PR4 decoded data 5 which is first decoded data and EPR4 decoded data 11 which is second decoded data, to be in generation so as to obtain an optimum detected data. And at the same time the condition discriminating signal 13 stops the operation of the decoder which is not selected, so as to reduce power consumption.

The timing control signal generator is designed to select and control the generation of PR4 decoded data which is first decoded data, stop of EPR4 decoded data which is second decoded data, stop of PR4 decoded data which is first decoded data, and generation of EPR4 decoded data which is second decoded data, all at different timings.

In this embodiment, at changing over of operation of the two decoders depending on the result of judgement by the signal condition discriminating circuit 12, the changeover timing is controlled, so that their power consumption is reduced.

As same reference numerals in FIG. 3 and FIG. 1 refer to same structure, block operation and signal function, their explanation is omitted here. The embodiment in FIG. 3 differs from the embodiment in FIG. 1 in that a timing control signal generator 52 is provided and in that the timing of selecting and stopping action of the decoders is controlled.

The timing control signal generator 52 generates an EPR4 control signal 53 and a PR4 control signal 54 based on the condition discriminating signal 13 obtained from the signal condition discriminating circuit 12. The EPR4 control signal 53 controls the operation and stop of the EPR4 Viterbi decoder 51. The PR4 control signal 54 controls the operation and stop of the PR4 Viterbi decoder 50. The timing control signal generator 52 also generates a selection signal 55 which controls the selector 14, so as to select one of PR4ML and EPR4ML to generate reproduced decoded data in optimum.

Since only one of the first and second decoding means is in operation, the power consumption of the data detecting apparatus can be reduced.

Figure 4:
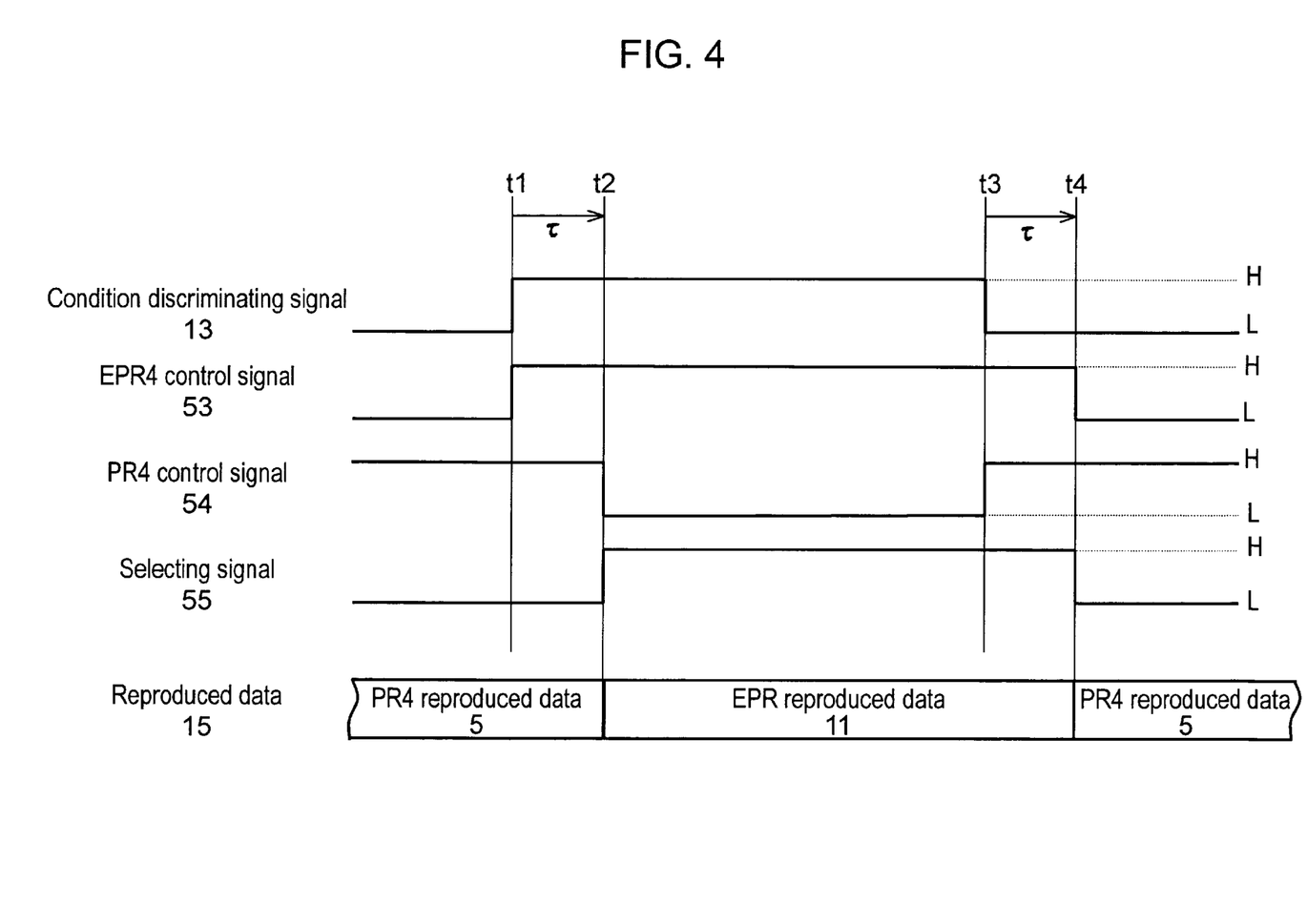
FIG. 4 is a timing chart explaining the operation of a timing control signal generator 52 in the invention.

FIG. 4 is a timing chart explaining the operation of the timing control signal generator 52 in the embodiment, showing the time relation of condition discriminating signal 13, EPR4 control signal 53 generated by the timing control signal generator 52, PR4 control signal 54, and selection signal 55. The condition discriminating signal 13 becomes H level (high voltage level) when it is judged that the EPR4ML system is more beneficial, and is otherwise L level (low voltage level). In FIG. 4, time t1 denotes the time at which the condition discriminating signal 13 turns to H level from L level, and time t3 denotes the time at which the condition discriminating signal 13 turns to L level from H level. A τ in the figure denotes the processing period needed for each of the PR4 Viterbi decoder 50 and the EPR4 Viterbi decoder 51 to decode an input signal. Times t2 and t4 denote the times delayed by the period τ from time t1 and t3 respectively.

In the period before time t1, when the condition discriminating signal 13 is at L level, the timing control signal generator 52 judges that the PR4ML system is more beneficial, and sets the PR4 control signal 54 to H level, and operates only the PR4 Viterbi decoder 50. At this time, the timing control signal generator 52 sets the EPR4 control signal 53 to L level, stops the operation of the EPR4 Viterbi decoder 51, and reduces the power consumption of the EPR4 Viterbi decoder 51. Also, the timing control signal generator 52 sets the selection signal 55 to L level, controls the selector 14, and selects the PR4 decoded data 5 as reproduced decoded data 15.

At time t1, when the condition discriminating signal 13 changes from L level to H level, the timing control signal generator 52 judges that the EPR4 is more beneficial, and sets the EPR4 control signal 53 to H level, so that the EPR4 Viterbi decoder 51 is put in operation. During the period τ from time t1 to time t2, although the EPR4 Viterbi decoder 51 is operating, the EPR4 decoded data 11 is not obtained correctly because of delay for decoding process. Therefore, it is necessary to keep operation of the PR4 Viterbi decoder 50 continuously for period τ. Herein, the timing control signal generator 52, for the successive period τ, sets the PR4 control signal 54 to H level, and continues to generate PR4 decoded data 5. Hence, the timing control signal generator 52 keeps generating the selection signal 55 in L level signal during the period τ so that the selector 14 may continue to select the PR4 decoded data 5 for the period τ from time t1 to time t2.

At time t2 after period τ from time t1, the EPR4 Viterbi decoder 51 issues the EPR4 decoded data 11 correctly, and the timing control signal generator 52 sets the PR4 control signal 54 to L level, and stops the operation of the PR4 Viterbi decoder 50, so as to reduce its power consumption. At this time, the timing control signal generator 52 sets the selection signal 55 to H level, and controls the selector 14 to select the EPR4 Viterbi decoded data 11.

Similarly, when the condition discriminating signal 13 changes from H level to L level again at time t3, contrary to the case of time t1 and time t2, the selector 14 continues to select the EPR4 decoded data 11 successively during period τ from time t3 to t4, and changes over to select the PR4 decoded data 5 at time t4 and to stop the operation of the EPR4 Viterbi decoder 51, so that the power consumption is reduced.

The PR4 Viterbi decoder 50 decodes the PR4 equalized signal 3 by maximum likelihood detection with use of the Viterbi decoding method according to the PR4 control signal 54 obtained from the timing control signal generator 52, and generates PR4 decoded data 5. The PR4 Viterbi decoder 50 operates during the PR4 control signal 54 is at H level as shown in FIG. 4, and stops the operation when the PR4 control signal 54 is at L level to save power consumption, and the PR4 decoded data 5 is generated only when the PR4 control signal 54 is at H level.

Similarly, the EPR4 Viterbi decoder 51 decodes the EPR4 equalized signal 9 by maximum likelihood detection with use of the Viterbi decoding method according to the EPR4 control signal 53 issued from the timing control signal generator 52, and generates EPR4 decoded data. The EPR4 Viterbi decoder 51 operates normally during the EPR4 control signal 53 is at H level as shown in FIG. 4, and stops the operation when the EPR4 control signal 53 is at L level to save power consumption, and the EPR4 decoded data is generated only when the EPR4 control signal 53 is at H level.

The selector 14 selects one of the PR4 decoded data 5 issued from the PR4 Viterbi decoder 50 and the EPR4 decoded data 11 issued from the EPR4 Viterbi decoder 51, as reproduced data 15 as shown in the bottom in FIG. 4, depending on the selection signal 55 issued from the timing control signal generator 52.

As clear from the description herein, the data detecting apparatus of the embodiment can detect data always at low error rate by automatically selecting the best method from among the PR4ML and EPR4ML every moment by monitoring the signal condition of the reproduced signal itself in real time. Further, while controlling the timing so as not to interrupt data at the time of selection, the power consumption can be reduced by stopping the other decoder which is not in use.

Figure 5:
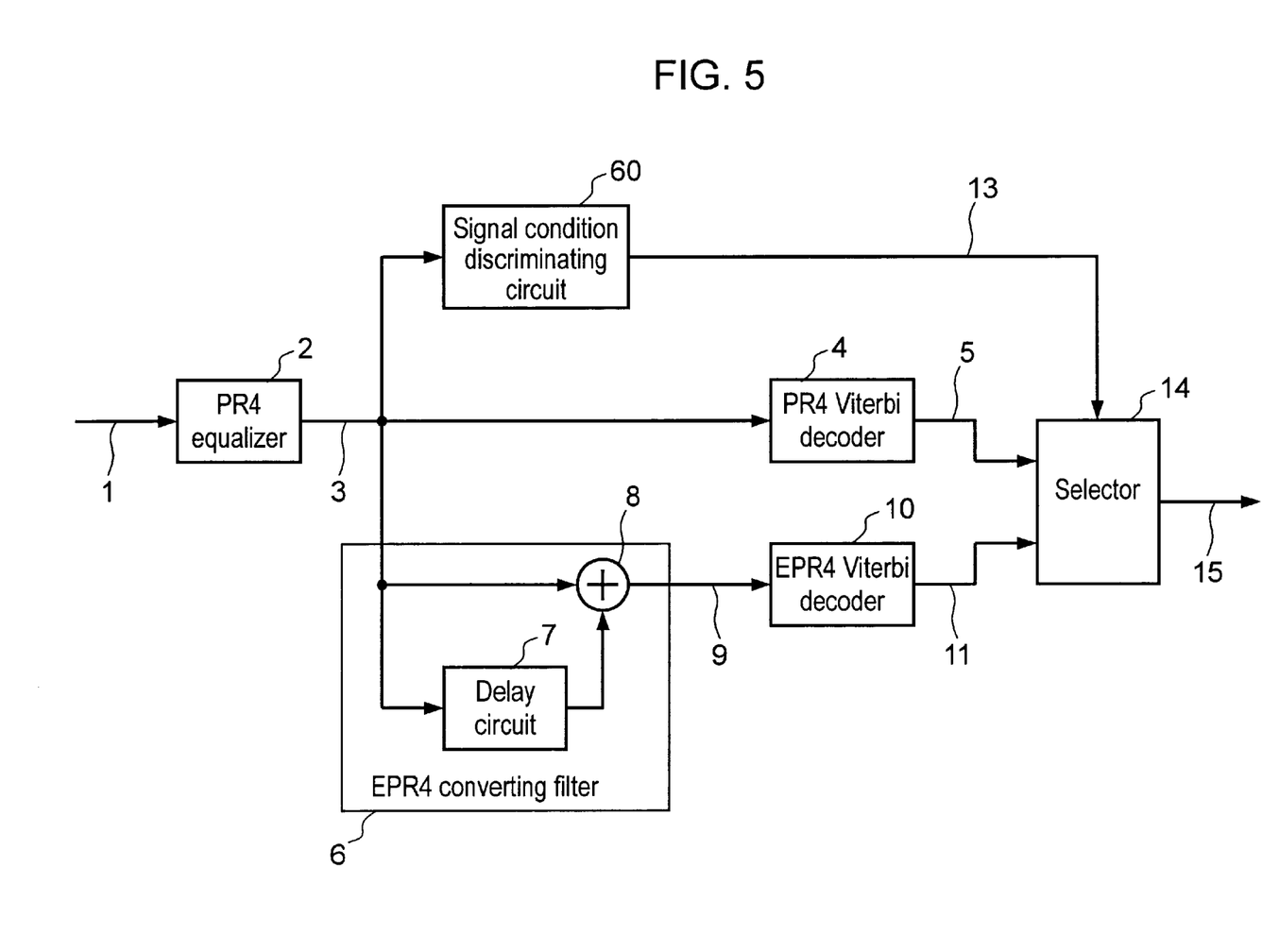
FIG. 5 is a block diagram showing a configuration of a different embodiment for realizing the data detecting method of the invention.

FIG. 5 is a block diagram showing a configuration of a different embodiment for realizing the data detecting method of the invention, relating to the data discriminating method of the signal condition of input signal by the output signal of only one equalizing circuit, and detecting data on the basis of the result of discrimination.

The PR4 equalizing circuit 2 equalizes the reproduced signal 1 by PR4, and obtains a PR4 equalized signal 3 which is a first equalized signal. From this first equalized signal of PR4 equalized signal 3, PR4 decoded data 5 is obtained as first decoded data.

On the other hand, the EPR4 equalizing circuit is substantially composed of PR4 equalizing circuit 2 and EPR4 converting filter 6. The EPR4 equalizing circuit obtains a PR4 equalized signal from reproduced signal 1 through the PR4 equalizing circuit 2, and filters it in the EPR4 converting filter 6, and obtains an EPR4 equalized signal 9 as second equalized signal. The EPR4 Viterbi decoder 10 obtains EPR4 decoded data 11 as second decoded data from the second equalized signal of EPR4 equalized signal 9.

Herein, a signal condition discriminating circuit 60 discriminates the signal condition of the reproduced signal 1 by only the first equalized signal of PR4 equalized signal 3, so as to obtain the condition discriminating signal 13 for discriminating the best data detecting method. The selector 14, in response to the condition discriminating signal 13, selects one of the first decoded data of PR4 decoded data 5 and second decoded data of EPR4 decoded data 11, as detected data 15.

Same reference numerals in FIG. 5 and FIG. 1 refer to same structure, block operation and signal function. Their explanation is omitted. In the embodiment in FIG. 5, the signal condition discriminating circuit 60 discriminates the signal condition of the input signal only by the PR4 equalized signal 3 of the PR4 equalizing circuit 2, and detects the data according to the result of discrimination, which is different from the embodiment in FIG. 1. Herein, therefore, only the operation of the signal condition discriminating circuit 60 is explained.

The signal condition discriminating circuit 60 issues a condition discriminating signal 13 based on the entered PR4 equalized signal 3. The condition discriminating signal 13 shows the result of estimation, same as in FIG. 1, which shows one of PR4ML system and EPR4ML system is better for detecting data at lower error rate.

Figure 6:
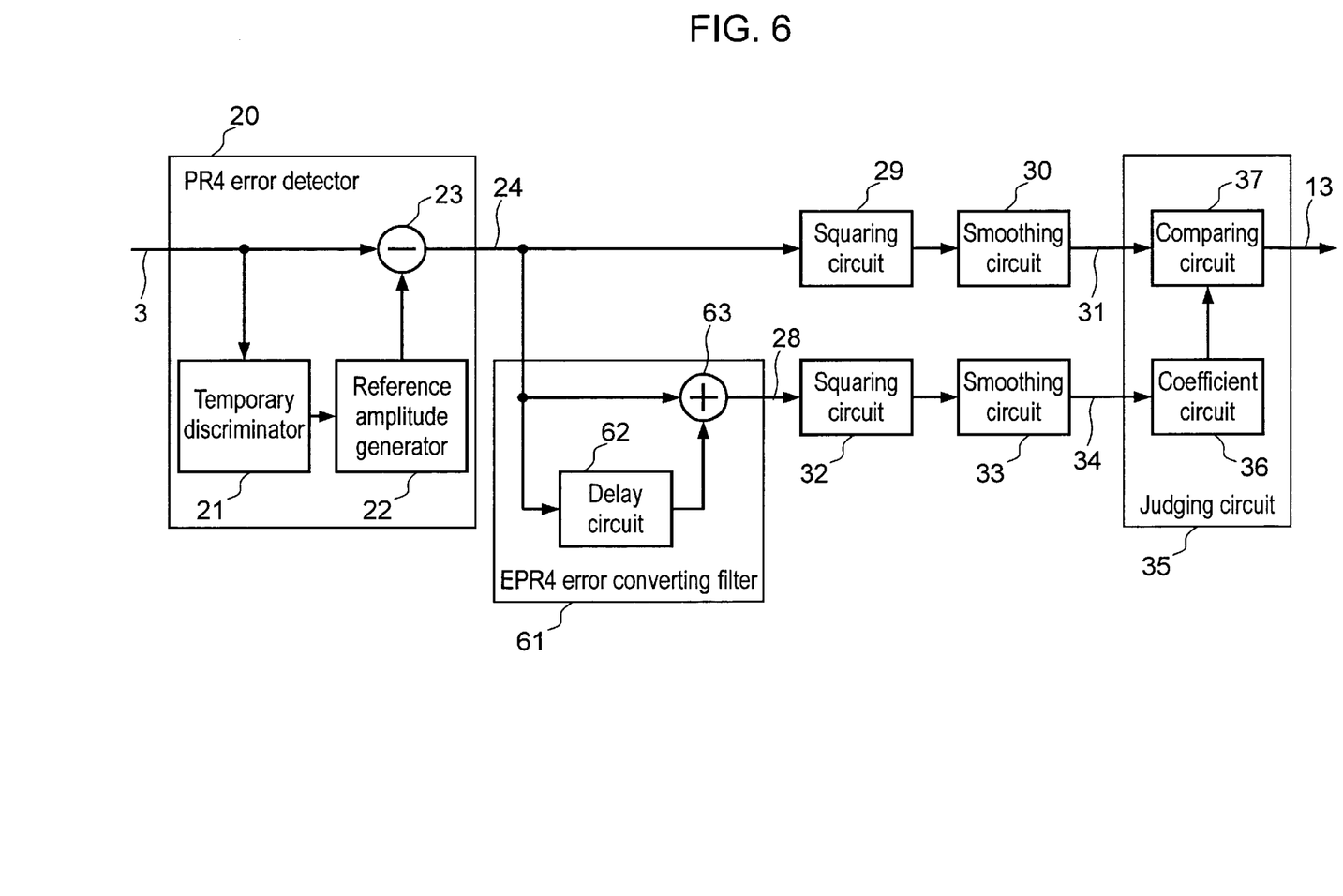
FIG. 6 is a block diagram showing a detailed structure of another signal condition discriminating circuit 60 in the invention.

FIG. 6 is a block diagram showing a detailed structure of the signal condition discriminating circuit 60. The signal condition discriminating circuit 60 is composed as shown below.

First, a PR4 error detector 20 detects an error from the first equalized signal of PR4 equalized signal 3, and extracts PR4 error signal 24 as a first error signal. A square circuit 29 and a smoothing circuit 30 average the squares of PR4 error signal 24 which is the first error signal, and obtain a PR4 smoothed error signal 31 as a first smoothed signal.

On the other hand, an EPR4 error converting filter 61 converts and filters the PR4 error signal 24 which is the error of the first error signal, and obtains an EPR4 error signal 28 as a second error signal by EPR4 equalizing method similar to FIG. 1. A square circuit 32 and a smoothing circuit 33 average the squares of EPR4 error signal 28 which is the second error signal, and obtain an EPR4 smoothed error signal 34 as a second smoothed error signal.

A judging circuit 35 discriminates the condition of reproduced signal 1 by means of the smoothed error signal 31 and smoothed error signal 34, and generates a condition discriminating signal 13.

It is an advantage of this structure that the condition of reproduced signal 1 can be discriminated only by the output signal of the first equalizing means.

In FIG. 6, same reference numerals are given to the same structure, block operation and signal function as in the signal condition discriminating circuit 12 of the embodiment shown in FIG. 2.

In FIG. 6, the signal condition discriminating circuit 60 comprises an EPR4 error converting filter 61, instead of the EPR4 error detector 38 of FIG. 2. The EPR4 error converting filter 61 is composed of a delay circuit 62 and an adder 63. The adder 63 adds the entered PR4 error signal 24 and the PR4 error signal delayed by one symbol period in the delay circuit 62 so as to forms an EPR4 error signal 28.

The PR4 error detector 20, same as in FIG. 2, detects an error of the entered PR4 equalized signal 3. The amplitude of the PR4 equalized signal 3 is any amplitude of A, 0, and −A in an ideal state free from noise. The PR4 error detector 20 detects the difference of the amplitude of the PR4 equalized signal 3 including noise from a reference amplitude which may be the ideal amplitude, that is, extracts an error amplitude, and issues it as a PR4 error signal 24.

The EPR4 error converting filter 61 detects an error when the entered PR4 error signal 24 is equalized by EPR4, and generates an EPR4 error signal 28. This EPR4 error signal 28 is an error amplitude of the difference between the EPR4 equalized signal amplitude and ideal amplitude, based on the relation of the intersymbol interference between PR4 and EPR4.

In the embodiment in FIG. 2, the EPR4 error signal is obtained such that the EPR4 equalized signal is compared with five reference values 2 A, A, 0, −A, −2 A, according to the result of this temporary discrimination. By contrast to this, in this embodiment of FIG. 6, the EPR4 error signal 28 is obtained based on the PR4 error signal 24 obtained by comparison of the PR4 equalized signal with the reference values A, 0, and −A. This constitution does not require the temporary step of discriminating the signal including noise with five reference values, and hence the error due to temporary discrimination is decreased. Therefore, the EPR4 error signal 28 of the embodiment of FIG. 6 is higher in precision than that of FIG. 2, and also the circuit scale of it can be reduced comparing with that of FIG. 2.

The PR4 error signal 24 and EPR4 error signal 28 obtained in this manner are processed almost similar to the embodiment in FIG. 2. That is, the PR4 error signal 24 is put into the square circuit 29, and the obtained square value of the error amplitude is smoothed in the smoothing circuit 30, and then a PR4 smoothed error signal 31 is obtained. The subsequent explanation is omitted.

Thus, the embodiment, similar to the foregoing embodiments, can detect data always at low error rate by monitoring the condition of the reproduced signal itself in real time, and automatically selecting the best method from among PR4ML and EPR4ML every moment.

In the signal condition discriminating circuit 60 of this embodiment, the error signals 24 and 28 are squared first and then smoothed, but as mentioned earlier, the same effects can be obtained by smoothing the absolute values of these error signals.

In addition, the signal condition discriminating means can discriminate the condition of reproduced signal only by the output signal of the first equalizing means, so it is realized in a simple structure.

Figure 7:
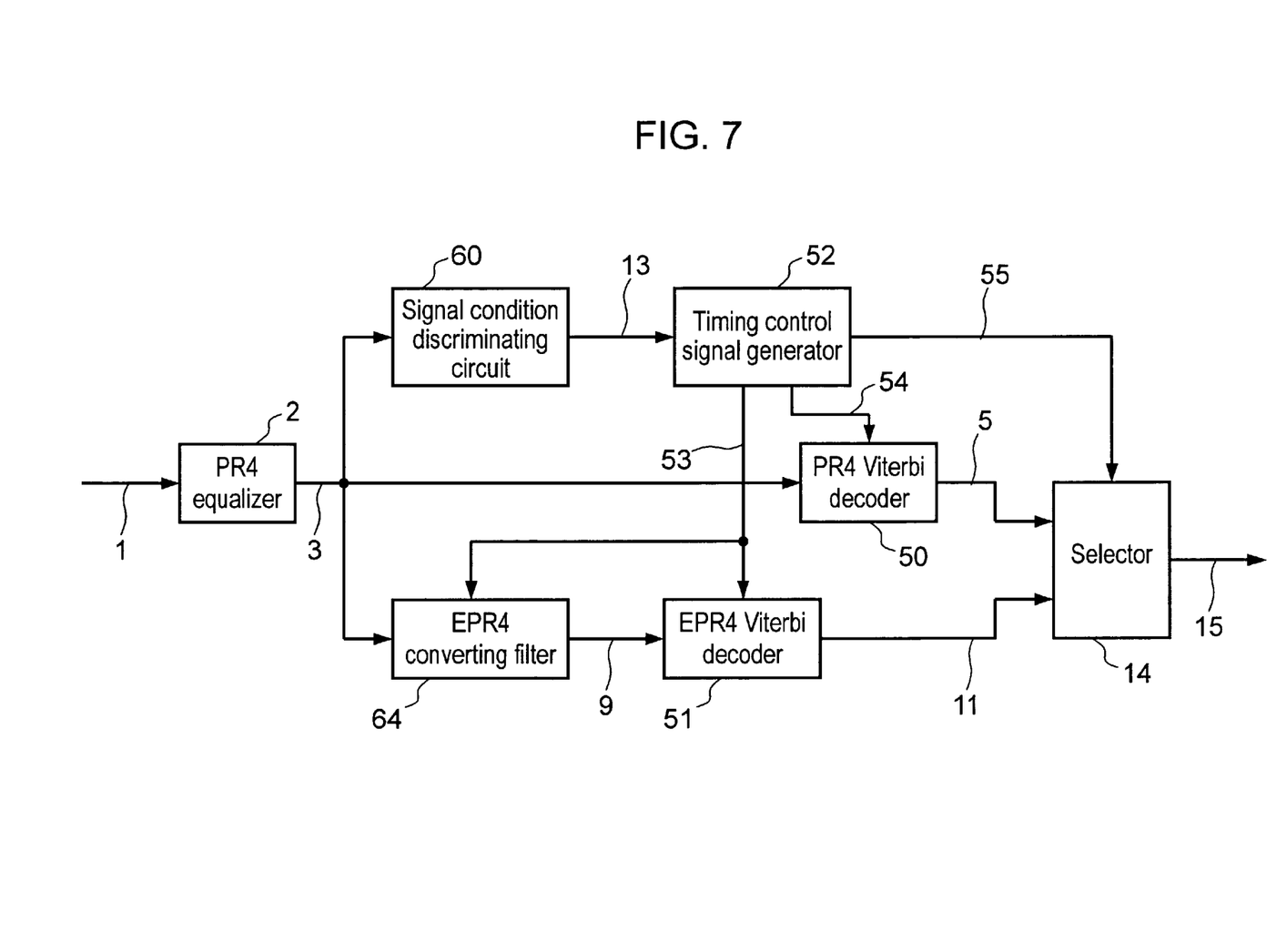
FIG. 7 is a block diagram showing a configuration of a further different embodiment for realizing the data detecting method of the invention.

FIG. 7 is a block diagram showing a configuration of a further different embodiment for realizing the data detecting method of the invention. In this embodiment, same as in the data detecting apparatus in the foregoing embodiments, two decoders are changed over and operated depending on the result of discrimination by the signal condition discriminating circuit 60, so that their power consumption is reduced.

Depending on the condition discriminating signal 13 which shows the signal condition of reproduced signal 1 and discriminates the optimum data detecting method, one of the first decoded data (PR4 decoded data 5) and second decoded data (EPR4 decoded data 11) is selected as detected data, but the other of them is stopped to operate, thereby this embodiment reduces power consumption.

Further this embodiment is designed, similar to the embodiment of FIG. 3, to select and control the generation of PR4 decoded data which is first decoded data, and the stop of generation of EPR4 decoded data which is second decoded data, or the stop of generation of PR4 decoded data which is first decoded data and generation of EPR4 decoded data which is second decoded data, all at different timings.

As a result, the power consumption is further reduced, and also the structure including the signal condition discriminating circuit 60 is simplified.

Same reference numerals in FIG. 7, FIG. 5 and FIG. 3 refer to same structure, block operation and signal function. Hence their explanation is omitted.

The PR4 equalizing circuit 2 equalizes the reproduced signal 1 of input by PR4, and issues a PR4 equalized signal 3. The signal condition discriminating circuit 60 discriminates the signal condition of the PR4 equalized signal 3 entered from the PR4 equalizing circuit 2 in same operation as in the embodiment in FIG. 5, and generates a condition discriminating signal 13 which is H level when the EPR4 system is more beneficial as shown in FIG. 4. A timing control signal circuit 52 generates a selection signal 55, same as in FIG. 3, by the condition discriminating signal 13 of the signal condition discriminating circuit 60, so as to control the selector 14. The timing control signal circuit 52 also generates an EPR4 control signal 53 which controls the start and stop operation of the EPR4 converting filter 64 and EPR4 Viterbi decoder 51. Further, the timing control signal circuit 52 generates a PR4 control signal 54 which controls the start and stop operation of the PR4 Viterbi decoder 50. The timing relation shown in FIG. 4 is same as in the embodiment of FIG. 3 among the condition discriminating signal 13 and the EPR4 control signal 53, PR4 control signal 54, and selection signal 55 generated by the timing control signal generating circuit 52. The PR4 Viterbi decoder 50 operates when the PR4 control signal 54 entered from the timing control signal generating circuit 52 is at H level, and stops its operation when the PR4 control signal 54 is at L level, thereby reducing the power consumption, and the PR4 decoded data 5 is generated depending on the PR4 control signal 54.

The EPR4 converting filter 64 and The EPR4 Viterbi decoder 51 operate when the EPR4 control signal 53 entered from the timing control signal generating circuit 52 is at H level, and stop their operation when it is at L level, thereby reducing the power consumption, and the EPR4 equalized signal 9 is generated and the EPR4 equalized signal 9 is decoded to generate EPR4 decoded data 11, respectively, depending on the EPR4 control signal 53.

The selector 14 selects the EPR4 decoded data 11 when the selection signal 55 issued from the timing control signal generating circuit 52 is at H level, and selects the PR4 decoded data 5 when the selection signal 55 is at L level, so as to generate reproduced detected data 15.

Having such structure and operation, the embodiment in FIG. 7 can detect data always at low error rate by automatically selecting the best method from among the PR4ML and EPR4ML every moment by monitoring the signal condition from the reproduced signal itself, in real time. Further, the embodiment of FIG. 7 is capable of generating the selected data without any interruption, and stopping the other decoder not in use by controlling the timing of signal generation as shown in FIG. 4, so that the power consumption can be reduced.

In particular, when compared with the embodiments in FIG. 2, FIG. 3, and FIG. 6, the embodiment in FIG. 7 is effective for improving the precision of condition discrimination, and reducing the circuit scale because of the signal condition being discriminated only by the PR4 equalized signal 3, and moreover decreasing the power consumption of the EPR4 converting filter 64 to reduce further the power consumption.

Thus, according to the invention, by monitoring the signal condition from the reproduced signal itself in real time, and automatically selecting the best method from among PR4ML and EPR4ML every moment depending on the condition of the reproduced signal, the detected data can always be detected at low error rate. In particular, for selection of the decoding method, it is not required to prepare previously such information as position information on the recording media, which indicates recording line density.

The best method of PR4ML and EPR4ML can be always selected automatically by the invention even if frequency components of signal and noise contained in the reproduced signal are varying due to characteristic fluctuations or aging effects of the recording media or magnetic head.

The invention is applicable even in the magnetic tape device, in which although the linear recording density is constant, the contact point of the recording media and magnetic head is relatively unstable, and the dominant relation among PR4ML and EPR4ML always changes.

The power consumption can be reduced without interrupting the data by controlling the operation of the decoder depending on the condition of the reproduced signal, when selecting the method. The invention is not limited to the magnetic recording and reproducing system alone, but is also applicable to reproduced signal processing of optical disk, or to receiving processing in communication.

What is claimed is:

1. A data detecting apparatus for equalizing an input signal by partial response by employing at least one of partial response class 4 (PR4) and extended partial response class 4 (EPR4), and decoding the input signal, comprising:
   (a) first equalizing means for equalizing the input signal by PR4, and generating a first equalized signal;
   (b) first decoding means for decoding the first equalized signal and obtaining first decoded data;
   (c) second equalizing means for equalizing the input signal by EPR4, and generating a second equalized signal;
   (d) second decoding means for decoding the second equalized signal and obtaining second decoded data;
   (e) condition discriminating means for discriminating the signal condition of the first equalized signal and second equalized signal, judging the optimum data detecting method, and generating a condition discriminating signal; and
   (f) selecting means for selecting one of the first decoded data and the second decoded data based on the condition discriminating signal, so as to obtain detected data.

2. The data detecting apparatus of claim 1,
wherein said second equalizing means includes first filter means for converting and filtering the entered first equalized signal, and converting into an EPR4 equalized signal.

3. The data detecting apparatus of claim 1 or 2,
wherein said signal condition discriminating means comprises:
   (e1) first error detecting means for extracting an error from the first equalized signal, and extracting a first error signal;
   (e2) first smoothing means for averaging one of the square value and the absolute value of the first error signal, and obtaining a first smoothed error signal;
   (e3) second error detecting means for extracting an error from the second equalized signal, and extracting a second error signal;
   (e4) second smoothing means for averaging one of the square value and the absolute value of the second error signal, and obtaining a second smoothed error signal; and
   (e5) judging means for judging the condition of the input signal from the condition of the first smoothed error signal and second smoothed error signal.

4. The data detecting apparatus of claim 3,
wherein said judging means includes comparing means for issuing the result of discrimination by
   (e5-1) selecting first decoded data which is the output of the first decoding means in a case when the first smoothed error signal is smaller in amplitude than the second smoothed error signal multiplied by a specific value; or
   (e5-2) selecting second decoded data which is the output of the second decoding means in the other cases.

5. The data detecting apparatus of claim 4, further comprising:
means for operating so as to reduce the power consumption by
   (g1) stopping the operation of said second decoding means when the condition discriminating signal judges that the first decoded data is optimum, and generating the first decoded data as detected data; or
   (g2) stopping the operation of said first decoding means when the condition discriminating signal judges that the second decoded data is optimum, and generating the second decoded data as detected data.

6. The data detecting apparatus of claim 5, further comprising:

timing control signal generating means for generating a control signal based on the discrimination result of the condition discriminating signal, wherein said timing control means selects and controls generation of first decoded data, stop of second decoded data, stop of first decoded data, and generation of second decoded data, each at different timing, thereby (fi) stopping the operation of said second decoding means when the condition discriminating signal judges that the first decoded data is optimum, and generating the first decoded data as detected data; or (f2) stopping the operation of said first decoding means when the condition discriminating signal judges that the second decoded data is optimum, and generating the second decoded data as detected data.

7. The data detecting apparatus of claim 3, further comprising:

means for operating so as to reduce the power consumption by stopping the operation of said second decoding means when the condition discriminating signal judges that the first decoded data is optimum, and generating the decoded data as detected date; or stopping the operation of said first decoding means when the condition discriminating signal judges that the second decoded data is optimum, and generating the second decoded data as detected data.

8. The data detecting apparatus of claim 7, further comprising:

timing control signal generating means for generating a control signal based on the discrimination result of the condition discriminating signal, wherein said timing control means selects and controls generation of first decoded data, stop of second decoded data, stop of first decoded data, and generation of second decoded data, each at different timing, thereby (f1) stopping the operation of said second decoding means when the condition discriminating signal judges that the first decoded data is optimum, and generating the first decoded data as detected data;or (f2) stopping the operation of said first decoding means when the condition discriminating signal judges that the second decoded data is optimum, and generating the second decoded data as detected.

9. The data detecting apparatus of claim 1, or 2, further comprising:

means for operating so as to reduce the power consumption by (g1) stopping the operation of said second equalizing means and second decoding means when the condition discriminating signal judges that the first decoded data is optimum, and generating the first decoded data as detected data; or (g2) stopping the operation of said first decoding means when the condition discriminating signal judges that the second decoded data is optimum, and generating the second decoded data as detected data.

10. The data detecting apparatus of claim 9, further comprising:

timing control signal generating means for generating a control signal based on the discrimination result of the condition discriminating signal, wherein said timing control means selects and controls generation of first decoded data, stop of second decoded data, stop of first decoded data, and generation of second decoded data, each at different timing, thereby (f1) stopping the operation of said second equalizing means and second decoding means when the condition discriminating signal judges that the first decoded data is optimum, and generating the first decoded data as detected data; or (f2) stopping the operation of said first decoding means when the condition discriminating signal judges that the second decoded data is optimum, and generating the second decoded data as detected data.

11. A data detecting method for equalizing an input signal by partial response by employing at least one of partial response class 4 (PR4) and extended partial response class 4 (EPR4), and decoding the input signal, comprising the steps of:

(a) equalizing the input signal by PR4, and obtaining a first equalized signal;

(b) obtaining first decoded data from the first equalized signal;

(c) equalizing the input signal by EPR4, and obtaining a second equalized signal;

(d) obtaining second decoded data from the second equalized signal;

(e) discriminating the signal condition of the first equalized signal and second equalized signal, judging the optimum data detecting method, and generating a condition discriminating signal; and (f) selecting one of the decoded data and second decoded data based on the condition discriminating signal issued at said step (e), so as to obtain detected data.

12. The data detecting method of claim 11, wherein said step (c) includes a step of converting and filtering the entered first equalized signal, and converting into an EPR4 equalized signal.

13. The data detecting method of claim 11 or 12, wherein said step (e) comprises the steps of:

(e1) extracting an error from the first equalized signal, and obtaining a first error signal;

(e2) averaging one of the square value and the absolute value of the first error signal, and obtaining a first smoothed error signal;

(e3) extracting an error from the second equalized signal, and obtaining a second error signal;

(e4) averaging one of the square value and the absolute value of the second error signal, and obtaining a second smoothed error signal; and (e5) judging the condition of the input signal from the condition of the first smoothed error signal and second smoothed error signal.

14. The data detecting method of claim 13, wherein said step (e5) includes a step of issuing the result of discrimination by (e5) selecting first decoded data in a case when the first smoothed error signal is smaller in amplitude than the second smoothed error signal multiplied by a specific value; or (e5-2) selecting second decoded data in the other cases.

15. A data detecting method for equalizing an input signal by partial response by employing at least one of partial response class 4 (PR4) and extended partial response class 4 (EPR4), and decoding the input signal, comprising the steps of:

(a) equalizing the input signal by PR4, and obtaining a first equalized signal;

(b) equalizing the input signal by EPR4, and obtaining a second equalized signal;

(c) judging the signal condition of the first equalized signal and second equalized signal, discriminating the optimum data detecting method, and generating a condition discriminating signal;

(d) obtaining the first decoded data from the first equalized signal when the condition discriminating signal judges that the first decoded data is optimum, and stopping the step of obtaining the second decoded data from the second equalized signal; and (e) obtaining the second decoded data from the second equalized signal when the condition discriminating signal judges that the first decoded data is not optimum, and stopping the step of obtaining the first decoded data from the first equalized signal.

16. The data detecting method of claim 15, further comprising a step of:

selecting and controlling generation of first decoded data, stop of second decoded data, stop of first decoded data, and generation of second decoded data, each at different timing, wherein data is detected without interruption at low power consumption.

* * * * *

UNITED STATES PATENT AND TRADEMARK OFFICE
CERTIFICATE OF CORRECTION

PATENT NO. : 6,724,555 B2
APPLICATION NO. : 09/803777
DATED : April 20, 2004
INVENTOR(S) : Haruo Ohta It is certified that error appears in the above-identified patent and that said Letters Patent is hereby corrected as shown below:

Column 15

Line 11, claim 6, "(fi)" should read -- (f1) --.

Line 23, claim 7, before "stopping" insert -- (g1), --.

Line 26, claim 7, before "decoded" insert -- first --.

Line 27, claim 7, before "stopping" insert -- (g2) --.

Line 48, claim 8, after "detected" insert -- data --.

Column 16

Line 32, claim 11, between "the" and "decoded" insert -- first --.

Line 37, claim 11, after "first" and before "equalized" insert one space to create one continuous sentence.

Line 58, claim 14, "(e5)" should read -- (e5-1) --.

Signed and Sealed this

Thirty-first Day of July, 2007

JON W. DUDAS
*Director of the United States Patent and Trademark Office*